United States Patent [19]

Becker et al.

[11] 3,977,828

[45] Aug. 31, 1976

[54] AQUEOUS DYESTUFF PREPARATIONS OF DYESTUFFS INSOLUBLE TO DIFFICULTLY SOLUBLE IN WATER

[75] Inventors: Carl Becker, Basel; Jacques Wegmann, Bettingen; Andres Schaub, Biel-Benken, all of Switzerland

[73] Assignee: Ciba-Geigy AG, Basel, Switzerland

[22] Filed: Sept. 17, 1974

[21] Appl. No.: 506,775

[30] Foreign Application Priority Data

May 9, 1974 Switzerland.......................... 6374/74
Sept. 2, 1974 Switzerland.......................... 11896/74

[52] U.S. Cl. ..................................................... 8/79
[51] Int. Cl.² ........................................... C09B 67/00
[58] Field of Search ................................... 8/79

[56] References Cited
UNITED STATES PATENTS

| | | | |
|---|---|---|---|
| 3,067,053 | 12/1962 | Tarantino ........................... | 106/308 |
| 3,547,572 | 12/1970 | Lunet et al. ............................. | 8/79 |
| 3,730,905 | 5/1973 | Koerner et al. .......................... | 8/79 |
| 3,775,056 | 11/1973 | Grossmann et al. ..................... | 8/79 |

FOREIGN PATENTS OR APPLICATIONS

| | | |
|---|---|---|
| 2,185,719 | 1/1974 | France |
| 2,160,970 | 7/1973 | France |
| 2,079,611 | 11/1971 | France |
| 2,198,983 | 4/1974 | France |
| 2,001,507 | 7/1970 | Germany |

*Primary Examiner*—M. J. Welsh
*Attorney, Agent, or Firm*—Wenderoth, Lind & Ponack

[57] ABSTRACT

New aqueous, stable, highly concentrated, finely dispersed, flowable dyestuff preparations having a low content of dispersing agents and a high content of dyestuff insoluble to difficultly soluble in water are described, which dyestuffs have a particle size smaller than 10 $\mu$, particularly smaller than 2 $\mu$, the said preparations being characterised in that they contain at least 10 percent by weight of water, at least 30 percent by weight of a finely dispersed dyestuff, especially a disperse or vat dyestuff, and a mixture consisting of at most 10 percent by weight of an anionactive dispersing agent, at most 5 percent by weight of a nonionic dispersing agent and at most 35 percent by weight of a hydrotropic agent as well as, optionally, further additives.

The said dyestuff preparations are especially useful for the preparation of printing pastes having an aqueous base or a water-in-oil emulsion base, which themselves can be used preferably for the printing of carrier materials, particularly paper, suitable for transfer printing.

18 Claims, No Drawings

AQUEOUS DYESTUFF PREPARATIONS OF DYESTUFFS INSOLUBLE TO DIFFICULTLY SOLUBLE IN WATER

The invention relates to aqueous dyestuff preparations insoluble to difficultly soluble in water, to a process for the preparation of these dyestuff preparations, to the use thereof for the preparation of printing pastes and to the use of these for the printing of carrier materials for transfer printing or for the printing of, in particular, textile materials, as well as to the use of the dyestuff preparations for the dyeing and printing of textile materials and also of printed carrier materials, as well as to the material dyed or printed by means of the said dyestuff preparations in the transfer printing process or in dyeing or printing processes.

Commercial forms of dyestuffs insoluble to difficultly soluble in water are known both as liquid preparations and powder preparations. The latter have the disadvantage that they have to be firstly dispersed in water before application; the former have the disadvantage that they require large amounts of dispersing agent, in most cases over 30% by weight, and contain a limited amount of dyestuff, of the order of 20% by weight. There was therefore a need, particularly with respect to the preparation of printing pastes for printing of carrier materials and to the use of these in transfer printing, to produce a commercial form of such dyestuffs which is directly ready for use, and which contains on the one hand a relatively small amount of dispersing agent and on the other hand a large amount of dyestuff; and which, furthermore, has a low electrolyte content, in order to thus render possible a more general application, for the preparation of printing pastes, also of thickening agents that are sensitive to electrolytes.

Aqueous dyestuff preparations have now been found which do not have the stated disadvantages. These new aqueous preparations have a low content of dispersing agents and of electrolytes, and they are stable, highly concentrated, finely dispersed and flowable, and contain dyestuffs insoluble to difficultly soluble in water, especially disperse dyestuffs or vat dyestuffs, of which the particle size is smaller than 10 $\mu$, particularly smaller than 2 $\mu$. The said aqueous preparations are characterised in that they preferably contain not less than 10 percent by weight, especially 20 to 30 percent by weight, of water, at least 30 percent by weight, especially 35 to 65 percent by weight, preferably 40 to 60 percent by weight, of a finely dispersed dyestuff insoluble to difficultly soluble in water, and a mixture consisting of at most 10 percent by weight, especially 1 to 5 percent by weight, of an anion-active dispersing agent, at most 5 percent by weight, especially 1 to 3 percent by weight, of a nonionic dispersing agent and at most 35 percent by weight, particularly 5 to 20 percent by weight, of a hydrotropic agent, optionally together with further additives.

Suitable dyestuffs insoluble to difficultly soluble in water are, in particular, disperse dyestuffs. Mention may be made, for example, of the basic dyestuffs of the Celliton and Palanil dyestuffs of BASF, of the Cibacet and Terasil dyestuffs of Ciba-Geigy, of the Artisil and Foron dyestuffs of Sandoz, and of the Duranol dyestuffs of ICI, to mention just a few. From the chemical point of view, various classes of dyestuffs are involved, such as, e.g. nitro dyestuffs, amino-ketone dyestuffs, ketoneimine dyestuffs, methine dyestuffs, nitrodiphenylamine dyestuffs, quinoline dyestuffs, aminonaphthoquinone dyestuffs, coumarin dyestuffs and, in particular, anthraquinone dyestuffs and azo dyestuffs, such as monoazo and disazo dyestuffs.

Further suitable dyestuffs are, for example, vat dyestuffs. Typical representatives belong, for example, to the following chemical classes: indigoid dyestuffs; anthraquinone vat dyestuffs, including also the anthrimide dyestuffs, anthraquinoneacridone dyestuffs, anthraquinonethiazole dyestuffs as well as anthraquinonylazine dyestuffs and, finally, derivatives of condensed ring systems; naphthalene dyestuffs; perylene dyestuffs; sulphurised carbazoles and quinone dyestuffs.

It is understood that the type of dyestuff within this given definition is to a great extent governed by the purpose for which these aqueous dyestuff preparations according to the invention are to be used. If they are to be employed, for example, for the preparation of printing pastes for subsequent use in transfer printing, then the employed dyestuffs insoluble to difficultly soluble in water will be those within the limits of the given definition which are suitable for the transfer printing process; these are, in particular, disperse dyestuffs which are converted at atmospheric pressure, at between 150° and 220°C, to the extent of at least 60% in less than 60 seconds into the vapour state, which are stable to heat and which can be transferred undecomposed.

Such disperse dyestuffs are, for example the monoazo dyestuffs of the formula

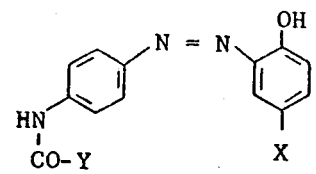

wherein X and Y each represent an alkyl radical having 1 to 4 carbon atoms,

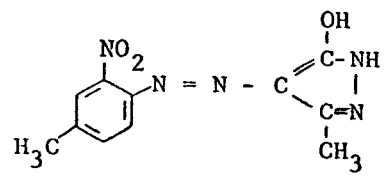

and

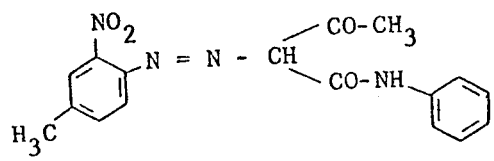

and, in particular, the quinophthalone dyestuff of the formula

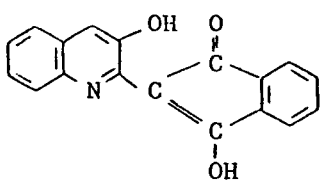

and the anthraquinone dyestuffs of the formulae

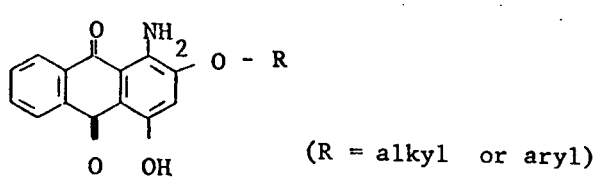

(Z = alkyl having 1 to 4 carbon atoms),

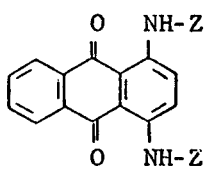     (R = alkyl or aryl)

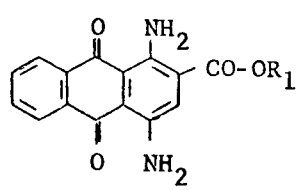     (R = Hal)

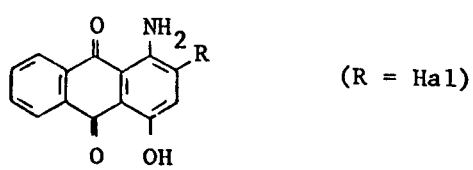

($R_1$ = alkyl having 3 to 4 carbon atoms),

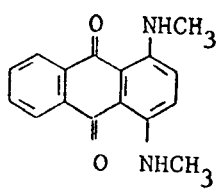

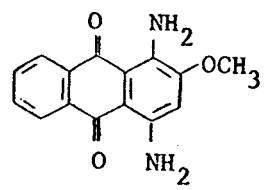

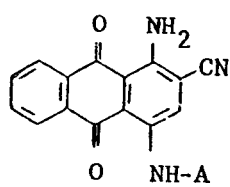

(A = alkyl or aryl), as well as brominated or chlorinated 1,5-diamino-4,8-dihydroxyanthraquinones.

A further important factor is the choice of dyestuffs in the case of dyestuff combinations, for only those dyestuffs that are similar in their transfer characteristics should be combined in the transfer printing process.

Furthermore, it is possible also to use mixtures of identical or different types of dyestuff within the limits as defined as well as optical brighteners in the said aqueous preparations.

Suitable anion-active dispersing agents are, e.g.: sulphated primary or secondary, purely aliphatic alcohols of which the alkyl chain contains 8 to 18 carbon atoms, e.g. sodium lauryl sulphate, potassium-α-methyl stearyl sulphate, sodium tridecyl sulphate, sodium oleyl sulphate, potassium stearyl sulphate, or the sodium salts of coconut oil alcohol sulphates; sulphated, unsaturated higher fatty acids or fatty acid esters, such as oleic acid, elaidic acid or ricinoleic acid, or lower alkyl esters thereof, e.g. ethyl ester, propyl ester or butyl ester, and the oils containing such fatty acids, such as olive oil, castor oil or rape oil; addition products of 1 to 20 moles of ethylene oxide with fatty amines, fatty acids or aliphatic alcohols having 8 to 20 carbon atoms in the alkyl chain, which addition products are converted into an acid ester by means of an organic dicarboxylic acid such as maleic acid, malonic acid or succinic acid, preferably however with an inorganic polybasic acid such as o-phosphoric acid or, in particular, sulphuric acid, for example, such addition products with stearylamine, oleylamine, stearic acid, oleic acid, lauryl alcohol, myristyl alcohol, stearyl alcohol or oleyl alcohol, such as the ammonium salt of sulphated lauryl alcohol triglycol ether, or of 1 to 5 moles of ethylene oxide with alkylphenols, such as the acid sulphuric acid ester of the addition product of 2 moles of ethylene oxide with 1 mole of p-nonylphenol, the acid sulphuric acid ester of the addition product of 1.5 moles of ethylene oxide with 1 mole of p-tert.octylphenol, the acid sulphuric acid ester of the addition product of 5 moles of ethylene oxide with 1 mole of p-nonylphenol, of the acid phosphoric acid ester of the addition product of 2 moles of ethylene oxide with 1 mole of p-nonylphenol, of the acid maleic acid ester of the addition product of 2 moles of ethylene oxide with 1 mole of p-nonylphenol; sulphated esterified polyoxy compounds, for example, sulphated, partially esterified polyvalent alcohols, such as the sodium salt of the sulphated monoglyceride of palmitic acid; instead of sulphates, it is also possible to use esters with other polyvalent mineral acids, e.g. phosphates; primary and secondary alkylsulphonates of which the alkyl chain contains 8 to 20 carbon atoms, e.g. ammonium decylsulphonate, sodium dodecylsulphonate, sodium hexadecanesulphonate and sodium stearylsulphonate; alkylarylsulphonates, such as alkylbenzenesulphonates having a straight-chain or branched-chain alkyl chain containing at least 7 carbon atoms, e.g. sodium dodecylbenzenesulphonate, 1,3,5,7-tetramethyloctylbenzenesulphonate, sodium octadecylbenzenesulphonate; such as alkylnaphthalenesulphonates, for example, sodium-1-isopropylnaphthalene-2-sulphonate; sodium dibutyl-naphthalenesulphonate; or such as dinaphthylmethanesulphonates, for example, the disodium salt of di-(6-sulphonaphthyl-2)-methane; sulphonates of polycarboxylic acid esters, for example, sodium dioctyl sulphosuccinate, sodium dihexylsulphophthalate; the sodium, potassium, ammonium, N-alkyl-, N-hydroxyalkyl-, N-alkoxyalkyl- or N-cyclohexylammonium or hydrazinium and morpholinium salts of fatty acids having 10 to 20 carbon atoms, which are designated as soaps, such as lauric, palmitic, stearic acid, or oleic acid of naphthenic acids, of resinic acids, such as abietic acid, e.g. the so-called rosin soaps; esters of polyalcohols, particularly mono- or diglycerides of fatty acids having 12 to 18 carbon atoms, e.g. the monoglycerides of lauric, stearic, palmitic or oleic acid, as well as the fatty acid esters of sugar alcohols, such as sorbitol, sorbitans and saccherose, for example, sorbitan monolaurate (Span 20), sorbitan palmitate (Span 40), sorbitan stearate (Span 60), sorbitan oleate (Span 80), sorbitan sesquiolate, sorbitan trioleate (Span 85), and the oxyethylation products thereof (Tween).

Anion-active dispersing agents which have proved particularly favourable are condensation products of aromatic sulphonic acids with formaldehyde, such as condensation products from formaldehyde and naphthalene sulphonic acids, or from formaldehyde, naphthalenesulphonic acid and benzensulphonic acid, or a condensation product from crude cresol, formaldehyde and naphthalenesulphonic acid, and lignin sulphonates and polyphosphates.

Normally, the anionic dispersing agents are in the form of their alkali salts, their ammonium salts or their water-soluble amine salts. Advantageously, qualities having a low content of foreign electrolytes should be used. It is also possible to employ mixtures of anionic dispersing agents.

Non-ionic dispersing agents are, for example: addition products of, for example, 5 to 50 moles of alkylene oxides, especially ethylene oxide, whereby some ethylene oxide units can be replaced by substituted epoxides such as styrene oxide and/or propylene oxide, with higher fatty acids, or with saturated or unsaturated alcohols, mercaptans or amines having 8 to 20 carbon atoms, or with alkylphenols or alkylthiophenols of which the alkyl radicals contain at least 7 carbon atoms; reaction products from higher-molecular fatty acids and hydroxyalkylamines; these can be prepared, for example, from higher-molecular fatty acids, preferably such ones having about 8 to 20 carbon atoms, e.g. caprylic acid, stearic acid, oleic acid and, in particular, from the mixture of acids embraced by the collective term "coconut fatty acid," and from hydroxyalkylamines such as triethanolamine or preferably diethanolamine, as well as from mixtures of these amines, whereby the reaction is so performed that the molecular quantity ratio between hydroxyalkylamine and fatty acid is greater than 1, for example 2:1. Such compounds are described in the American Patent Specification No. 2,089,212; condensation products of alkylene oxide, especially ethylene oxide, whereby some ethylene oxide units can be replaced by substituted epoxides, such as styrene oxide and/or propylene oxide.

Fatty alcohol polyglycol ethers have proved particularly advantageous, especially those having more than 20 moles of ethylene oxide, such as cetyl-stearyl alcohol etherified with 25 moles of ethylene oxide, stearyl-oleyl alcohol etherified with 80 moles of ethylene oxide and oleyl alcohol etherified with 20 moles of ethylene oxide. Furthermore, phenol ethers such as p-nonylphenol etherified with 9 moles of ethylene oxide, ricinoleic acid ester having 15 moles of ethylene oxide and hydroabietyl alcohol etherified with 25 moles of ethylene oxide are also very suitable.

These nonionic dispersing agents advantageously have a low electrolyte content. Mixtures of such agents are possible and in some cases they have synergetic effects.

By hydrotropic agents used in the aqueous dyestuff preparations according to the invention are meant those agents capable of converting the dispersion of the dyestuffs insoluble to difficultly soluble in water into a stable deflocculated form, without in the process a chemical reaction occurring between the dyestuff and the hydrotropic substance. These compounds should be water-soluble. Suitable substances having these properties are, for example: hydrotropic salts such as the sodium salt of benzoic acid, the sodium salt of benzenesulphonic acid, the sodium salt of p-toluenesulphonic acid or the sodium salt of N-benzylsulphanilic acid. Compounds which have proved particularly advantageous in this connection are, however, nitrogen-containing compounds, such as urea and derivatives thereof, for example, dimethylurea or guanidine chloride, or the amides such as acetamide and propionamide and derivatives thereof, especially N-methylacetamide.

With the application according to the invention of the hydrotropic substance in combination with dispersions of the dyestuffs as defined, a stabilisation of the deflocculated dispersion is obtained without any actual dissolving of the dyestuffs occurring.

By virtue of this combination according to the invention, namely of the anion-active and nonionic dispersing agent and of the hydrotropic agent in the given amounts, it is possible to obtain aqueous dyestuff preparations of, in particular, disperse dyestuffs, which preparations have on the one hand a low content of dispersing agents and, on the other hand, a high content of dyestuff, and which are characterised in particular by their stability both in the hot state and in the cold state in a temperature range of between about minus 10°C and plus 60°C; by a storage-stability of several months; by free flowability; by their finely dispersed form; and by their low viscosity in the range of about 1 to 1000 cp/20°C.

In consequence of the high proportion by weight of dyestuff, the aqueous dyestuff preparations according to the invention are very compact and provide a saving in space. A reduction of the space required for storage and dispatch and in transport is therefore ensured.

If desired or required, these dyestuff preparations can contain further additives for improving properties, such as hygroscopic agents, e.g. glycols or sorbitols; antifrost agents, e.g. ethylene glycol or monopropylene glycol; antimicrobics; fungicides, e.g. aqueous formalin solution; antifoaming agents and agents improving viscosity.

As a result of the presence of about 10% of sorbitol, there can moreover be obtained a fully satisfactory redispersibility of the completely dried-out paste.

By virtue of their high content of dyestuff, the said dyestuff preparations are greatly superior to the liquid preparations at present on the market, since, on account of their lower content of dispersing agents and extenders, they can be processed into low-viscous printing inks having adequate dyestuff concentration. Highly concentrated preparation systems having a low content of dispersing agents are required in the printing on paper by solvent-free, purely aqueous printing processes using roller, flexo and, in particular, rotary screen printing machines, Since paper, compared with textile materials, has a clearly reduced absorption capacity for printing inks, the recipes suitable for direct printing on textiles cannot be used, particularly for deeper shades.

The new aqueous dyestuff preparations are prepared, for example, by a process in which the dyestuff as defined is mixed and ground in water with at least one of the mentioned anion-active and/or nonionic dispersing agents, an operation which is carried out, e.g. in a ball mill or sand mill, with the remaining components being added beforehand or during or even after the grinding process, so that a preparation having a particle size smaller than 10 $\mu$, especially smaller than 2 $\mu$, is obtained.

The new aqueous dyestuff preparations are used, advantageously after dilution with water, for the dyeing or printing of textile materials by the continuous or discontinuous method of operation. Depending on the dyestuffs used in the preparations, the widest variety of textile materials can be dyed or printed with the said preparations, such as polyester materials or fibre materials with the use of preparations containing disperse dyestuffs.

A preferred application possibility is moreover that whereby these dyestuff preparations can be used for the preparation of printing pastes with a water base or with a water-in-oil emulsion base, which printing pastes are used either for conventional printing of, in particular, textile materials, or preferably, for printing of carrier materials, such as especially paper, which, in their turn, are used in the transfer printing process on textile materials.

Also in the preparation of printing pastes for traditional textile printing, it is of value to use dyeing preparations having the lowest possible content of dispersing agent, since the disperse dyestuffs at present available contain large amounts of dispersing agent, which have to be washed out after fixing and thus unnecessarily contaminate the waste water.

Since the dyestuff preparations according to the invention have a low electrolyte content compared with that of commercial preparations of disperse dyestuffs, the thickeners used for the preparation of the said printing pastes can be sensitive to electrolytes. In this connection, thickeners in particular having a polyacrylic base have proved especially valuable.

The following examples illustrate the invention without in any way limiting its scope. 'Parts' are given as parts by weight, and temperatures are expressed in degrees Centigrade.

A. Manufacture of the dyestuff preparations

EXAMPLE 1

500 parts of the dry dyestuff of the formula

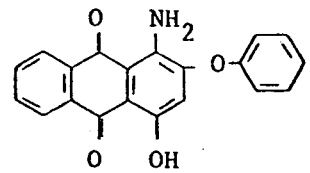

are slowly introduced, with vigorous stirring, into a solution of 30 parts of an anion-active dispersing agent (formaldehyde condensed with the sodium salt of naphthalene sulphonic acid) and 110 parts of urea, as the hydrotropic agent, in 220 parts of water and 50 parts of monopropylene glycol, and the whole is homogenised for about one hour and deaerated.

This 55% dyestuff mixture is then ground in an open mill by means of 2000 parts of Siliquarzit balls (1 mm diameter) for about 10 hours. After this length of time there is obtained a dispersion having a particle size of less than 5 $\mu$. The ground material is diluted to 1000 parts by the addition of a further 60 parts of monopropylene glycol, 10 parts of 35% aqueous formalin solution, as well as 20 parts of a fatty alcohol polyglycol ether as a nonionic dispersing agent (cetyl-stearyl alcohol etherified with 25 moles of ethylene oxide), and the whole is then homogenised for 15 minutes. Optionally, there is also added an antifoaming agent. The grinding agent is subsequently removed to leave a free-flowing aqueous preparation having a dyestuff content of about 50 percent by weight. This preparation has a low viscosity (500 cp/20°) and remains unchanged during a storage time of several weeks.

If, instead of the dyestuff, anion-active dispersing agent, nonionic dispersing agent and hydrotropic agent given in the above example, there are used identical parts of the components shown in the following Table 1, with the procedure being otherwise as described, then likewise there are obtained storage-stable, free-flowing aqueous dyestuff preparations having analogous properties, of which the dyestuff content and grinding time are in each case governed by the dyestuff used and are between 40 and 60 percent by weight and 5 to 10 hours, respectively.

Table I

| Example No. | Dyestuff | Anion-active dispersing agent | Nonionic dispersing agent | Hydrotropic agent |
|---|---|---|---|---|
| 2 | (anthraquinone with NH-CH$_3$ groups) | lignin sulphonate | fatty alcohol polyglycol ether (stearyl/oleyl alcohol etherified with 80 moles of ethylene | acetamide |

Table I-continued

| Example No. | Dyestuff | Anion-active dispersing agent | Nonionic dispersing agent | Hydrotropic agent |
|---|---|---|---|---|
| | | | oxide | |
| 3 | [structure: quinoline with OH and dicarbonyl/benzene] | polyphosphate (Calgon) | phenol ether (p-nonylphenol etherified with 9 moles of ethylene oxide) | urea |
| 4 | [structure: anthraquinone with NH₂, CN, NH-phenyl] | condensation product from about 2 moles of naphthalene-sulphonic acid and 1 mole of formaldehyde | mixture of 6 parts of ricinoleic acid ester with 15 moles of ethylene oxide with 1 part of fatty alcohol polyglycol ether (cetyl/stearyl alcohol etherified with 25 mol of ethylene oxide) | acetamide |
| 5 | [structure: anthraquinone with NH₂, Cl, Cl, NH₂] | condensation product from naphthalenesulphonic acid, formaldehyde and benzenesulphonic acid | fatty alcohol polyglycol ether (oleyl alcohol etherified with 20 moles of ethylene oxide) | acetamide |
| 6 | [structure: CH₃-C(=O)-HN-phenyl-N=N-phenyl-OH with CH₃] | lignin sulphonate | hydroabietyl alcohol etherified with 25 moles of ethylene oxide | dimethyl-urea |
| 7 | [structure: anthraquinone with NH₂, OCH₃, NH₂] | mixture of 1 part of condensation product from crude cresol, formaldehyde and naphthalenesulphonic acid with 1 part of lignin sulphonate | fatty alcohol polyglycol ether (cetyl/stearyl alcohol etherified with 25 moles of ethylene oxide) | dimethyl-urea |
| 8 | [structure: anthraquinone with two NH-C(=O)-phenyl groups] | condensation product from 2 moles of naphthalenesulphonic acid and 1 mole of formaldehyde (low salt content) | fatty alcohol polyglycol ether (cetyl/stearyl alcohol etherified with 25 moles of ethylene oxide) | urea |
| 9 | mixture of dyestuffs (%=% by wt) Example 1   38% | condensation product from about 2 | fatty alcohol polyglycol ether | urea |

Table I-continued

| Example No. | Dyestuff | | Anion-active dispersing agent | Nonionic dispersing agent | Hydrotropic agent |
|---|---|---|---|---|---|
| 10 | Example 2<br>Example 3<br>(anthraquinone structure with $NH_2$, Cl, OH groups) | 47.5%<br>14.5% | moles of naphthalenesulphonic acid and 1 mole of formaldehyde condensation product from about 2 moles of cresol, 0.2 mole of 2-naphthol-6-sulphonic acid and 3 mol of formaldehyde | (cetyl/stearyl alcohol etherified with 25 moles of ethylene oxide)<br>" | guadinine chloride |
| 11 | (anthraquinone structure with $NH-CH(CH_3)_2$ groups) | | poly-2-naphthyl-methane-sulphonic acid | " | N-methyl-acetamide |

B. Application of the dyestuff preparations

EXAMPLE 12

Printing pastes are obtained by the mixing, by vigorous stirring, of a preparation produced according to Examples 1 to 7 or 9 into an aqueous polyacrylate solution. These printing pastes can be used for printing paper in the rotary screen printing process. The paper thus printed can then be used in the transfer printing process, preferably with application to polyester textile materials, with sharply outlined, deeply coloured printings being obtained.

EXAMPLE 13

100 parts of the preparation according to Example 8 are dispersed by stirring in 1900 parts of water. A fabric made from mercerised cotton is impregnated with the liquor thus obtained; the material is squeezed out to leave an increase in weight of 60%, and subsequently dried in a stream of hot air.

The fabric is afterwards impregnated in an aqueous solution containing per liter 20 parts of sodium hydroxide and 40 parts of sodium dithionite at a temperature of 20°C, the material is then squeezed out to give a 60% increase in weight; it is subsequently steamed in a steamer free from air for 30 seconds, and finished by oxidation, rinsing, soaping and drying in the usual manner.

There is obtained a strong, fast yellow dyeing having excellent levelness.

EXAMPLE 14

100 parts of the preparation according to Example 3 are diluted with 1900 parts of water. A knitted fabric is impregnated with the resulting dispersion and then squeezed out to 50% increase in weight; it is dried in a stream of hot air, and additionally thermofixed for 60 seconds at 200°. The yellow dyeing obtained is rinsed and dried; the resulting dyeing is characterised by a solid level appearance and very good fastness properties.

EXAMPLE 15

In each case, 100 parts of the dyestuff preparation according to Examples 3 and 8 are diluted with 1800 parts of water; there is then impregnated therein a mixed fabric made from identical parts of polyester and cotton; the material is squeezed out to 60% increase in weight, dried and thermofixed for 60 seconds at 200°; it is subsequently impregnated in an aqueous bath containing per liter 20 parts of sodium hydroxide and 40 parts of sodium dithionite, then steamed for 60 seconds, oxidised, rinsed, soaped and dried. There is obtained a level yellow tone-in-tone dyeing having very good fastness properties and a solid appearance.

EXAMPLE 16

A printing paste is prepared by stirring 15 parts of a dyestuff preparation according to Example 1 into 85 parts of a 2.5% aqueous solution of a sodium alginate compound as the stock thickening.

This printing paste of about 8000 cP is applied with a photogravure printing device to paper. The paper thus printed can be used in the transfer printing process, e.g. on polyester textiles. There are obtained sharp-outlined level prints having a high intensity of colour.

It is worthy of note that the viscosity of the stock thickening, the consistency of which is very important for a good printing result, is only very slightly changed by the stirring-in of the large amount of dyestuff.

If, instead of the stated dyestuff and the mentioned stock thickening, those given in the following Table II are used in the amount stated, then likewise there are obtained printing pastes which can be used on paper or on other suitable intermediate carriers in flat screen printing, in rotary screen printing, in photogravure printing or in relief printing, or in other suitable printing processes such as spraying, brushing, etc..

Table II

| Example | Dyestuff preparation | Stock Thickening |
|---|---|---|
| 17 | 15 parts according to Example 2 | 85 parts of a 2.5% aqueous solution of weakly alkaline, anionic carob bean flour derivative |
| 18 | 15 parts according to Example 3 | 85 parts of a 2% aqueous solution of neutral, nonionic, depolymerised guar flour |
| 19 | 15 parts according to Example 4 | 85 parts of a 2% aqueous solution of neutral, nonionic, hydroxyethylated locust bean flour |
| 20 | 15 parts according to Example 5 | 85 parts of an oil-in-water emulsion with 1.5% carob bean flour |
| 21 | 15 parts according to Example 6 | 85 parts of an 8% aqueous solution of nonionic neutral carob bean flour ether thickening |
| 22 | 15 parts according to Example 7 | 85 parts of a 2.5% aqueous solution of anionic alkaline carob bean flour ether thickening |
| 23 | 15 parts according to Example 9 | 85 parts of a 3.5% aqueous solution of a mixture of carob bean flour and starch ether |
| 24 | 15 parts according to Example 1 | 85 parts of a 5% aqueous solution of anionic, weakly alkaline starch ether |
| 25 | 15 parts according to Example 2 | 85 parts of a 2% aqueous solution of carboxymethylcellulose |
| 26 | 15 parts according to Example 3 | 85 parts of a 1.25% aqueous solution of hydroxyethylcellulose |
| 27 | 15 parts according to Example 4 | 85 parts of an 0.8% aqueous solution of a high polymer polyacrylic acid |
| 28 | 15 parts according to Example 5 | 85 parts of a 6% aqueous solution of autocross-linking, thickening polymerisate paste based on acrylate |
| 29 | 15 parts according to Example 6 | 85 parts of a 6% aqueous solution of a paste made from copolymer based on maleic acid |
| 30 | 15 parts according to Example 7 | 85 parts of a 6% aqueous solution of carob bean flour ether with colloidal silicic acid |
| 31 | 15 parts according to Example 9 | 85 parts of a 10% aqueous solution of lignin-containing carboxymethyl cellulose |
| 32 | 15 parts according to Example 1 | 85 parts of a water-in-oil emulsion with Na-alginate as protective colloid |

EXAMPLE 33

The printing pastes obtained according to Examples 16 to 32 can be printed on textile materials based on polyester, cellulose triacetate, polyamide or polyacrylonitrile, and subsequently dried and fixed by methods normally applied for the individual fibres. Optionally, further additives may be added to these printing pastes to improve fixing.

EXAMPLE 34

It is possible, provided that the thickening agents concerned permit it, to mix together the printing pastes obtained according to Examples 16 to 32 in order to obtain particularly desired effects, such as levelness, dyestuff yield or run properties.

EXAMPLE 35

100 parts of the dyestuff preparation according to Example 8 are diluted with 150 parts of water, and the whole is stirred into 750 parts of a thickening consisting of 60 parts of a 10% aqueous starch ether solution, 10 parts of glycerin, 17 parts of potassium carbonate, 4 parts of water and 9 parts of sodium sulphoxylate.

The printing paste thus obtained is printed by means of stencils on a cotton fabric of 120 g/m² in weight, which has been pretreated in the normal manner for printing, dried, and afterwards steamed for 10 minutes at 100-105° with the exclusion of air and subsequently washed. There is obtained a sharply-outlined, deeply coloured print.

EXAMPLE 36

The following preparation is produced: 30 parts of a locust bean flour derivative are mixed with 420 parts of water, and the whole is stirred together with a solution of 500 parts of water and 50 parts of starch ether. To 7 parts of this preparation there are added, under a high-speed stirrer, 1 part of the dyestuff preparation according to Example 8, 1 part of water and 1 part of a high-boiling white spirit, and the whole is then printed, by means of heliogravure rollers, onto a fabric made from cellulose-viscose having a weight per unit area of 250 g/m², and subsequently dried. The material is afterwards impregnated with an aqueous solution containing 40 parts of NaOH, 65 parts of Na-dithionite, 15 parts of borax and 880 parts of water; it is then squeezed out to 100% increase in weight and fixed in a steamer free from air for 35 seconds at 120°; it is finally rinsed cold and then hot and dried. There is obtained a strong, sharply-outlined print in a yellow shade.

EXAMPLE 37

150 parts of the dyestuff preparation according to Example 8 are worked into 850 parts of a solution-dispersion of thermoplastic substances, and the whole is applied to a coated paper in the heliogravure process. After drying and, optionally, storage, the paper is brought into contact under pressure for 2 to 10 seconds at 200° with a cotton fabric having a weight per unit area of 120 g/m², which has been normally pretreated for printing. The transferred dyestuff is afterwards fixed analogously to the fixing in Example 36 by means of an NaOH-Na-dithionite solution and finally finished. The result is a strong level yellow printing exactly reproducing the fine details of the engraving.

EXAMPLE 38

100 parts of the dyestuff preparation according to Example 8 are stirred into 900 parts of the preparation described below, and the whole is applied by any desired printing process to a textile article which can be made from natural, regenerated or fully synthetic fibres. After drying, the material is treated in hot air for 5 to 10 minutes at 140° to 150°. There is obtained a printing in a deep shade.

The said preparation is obtained as follows:
40 parts of water,
10 parts of condensed alkylpolyglycol ether and
30 parts of a 3% aqueous carob bean flour ether solution are mixed together; subsequently
690 parts of heavy benzene (boiling range 120° to 180°) are worked in with a high-speed stirrer, and finally
30 parts of a 30% aqueous diammonium phosphate solution and
200 parts of a 40% synthetic resin dispersion based on autocross-linking copolymers having an acrylate base are added.

What we claim is:

1. An aqueous stable, highly concentrated finely dispersed flowable dyestuff composition comprising at least 10% by weight of water, at least 30% by weight of at least one finely dispersed dyestuff insoluble to difficultly soluble in water having a particle size smaller than 10μ and a mixture consisting of at most 10% by weight of an anion-active dispersing agent, at most 5% by weight of a nonionic dispersing agent and at most 35% by weight of a hydrotropic agent capable of converting the dyestuff into a stable deflocculated form.

2. A composition according to claim 1 wherein the dyestuff has a particle size smaller than 2μ.

3. A dyestuff composition according to claim 1 which contains 1 to 5 percent by weight of an anion-active dispersing agent, 1 to 3 percent by weight by a nonionic dispersing agent and 5 to 20 percent by weight of a hydrotropic agent.

4. A dyestuff composition according to claim 1 which contains 35 to 65 percent by weight by at least one dyestuff therein.

5. A dyestuff composition according to claim 1 which contains at least 40 to 60 percent by weight of at least one dyestuff therein.

6. A dyestuff composition according to claim 1 wherein the dyestuff is a disperse dyestuff or a vat dyestuff.

7. A dyestuff composition according to claim 6 wherein the dyestuff is one used in the transfer printing process.

8. A dyestuff composition according to claim 1 wherein the anion-active dispersing agent is selected from the group consisting of condensation products of aromatic sulphonic acids with formaldehyde, lignin sulphonates and polyphosphates.

9. A dyestuff composition according to claim 1 wherein the nonionic dispersing agent is selected from the group consisting of a fatty alcohol polyglocol ether, a phenol ether and a ricinoleic acid ester.

10. A dyestuff composition according to claim 1 wherein the hydrotropic agent is selected from the group consisting of nitrogen-containing compounds.

11. A dyestuff composition according to claim 10 wherein the nitrogen-containing compounds are selected from the group consisting of urea and dimethylurea.

12. In a printing paste composition comprising a dyestuff composition and a thickener in an aqueous base or water-in-oil emulsion base, the improvement wherein the dyestuff composition is the dyestuff composition of claim 1.

13. A printing paste according to claim 12 wherein the thickener is a polyacrylic acid thickener.

14. In a method of dyeing a textile material by impregnating a textile material with an aqueous dyestuff composition followed by drying the thus-dyed textile, the improvement wherein the dyestuff composition is the composition of claim 1.

15. In a method of dyeing a textile material by contacting a textile material with a printing paste containing a dyestuff followed by drying the thus-dyed textile, the improvement wherein the printing paste is the printing paste of claim 12.

16. In a method of transfer dyeing a textile material by applying a printing paste containing a dyestuff to a carrier material followed by transferring the dyestuff from the carrier material to a textile material by application of heat, the improvement wherein the printing paste is the printing paste of claim 12.

17. A dyestuff composition according to claim 1 comprising 40 to 60 percent by weight of the dyestuff of the formula

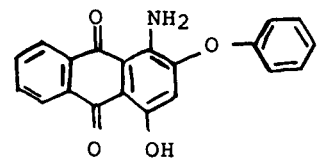

1.0 to 5 percent by weight of the sodium salt of an anion-active condensation product of naphthalenesulphonic acid with formaldehyde, 1 to 3 percent by weight of cetyl stearyl alcohol, etherified with 25 moles of ethylene oxide, an effective fungicidal amount of a 35% aqueous formalin solution, an effective amount of 1,2-propylene glycol as an antifrost agent, 5 to 20 percent by weight of urea, and 20 to 30 percent by weight of water.

18. A dyestuff composition according to claim 1 comprising 40 to 60 percent by weight of a dyestuff mixture of the dyestuffs of the formulae

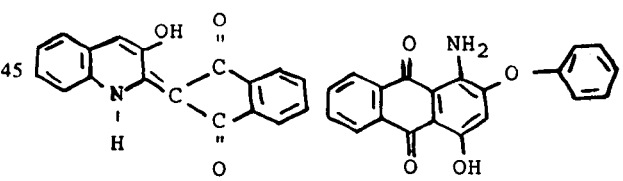

and

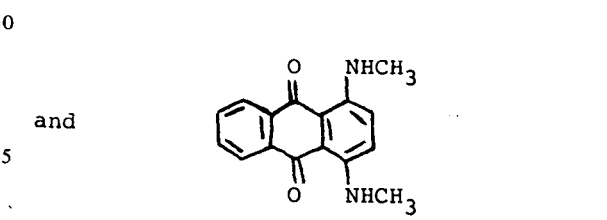

1.0 to 5 percent by weight of the sodium salt of an anion-active condensation product of naphthalenesulphonic acid with formaldehyde, 1 to 3 percent by weight of cetyl-stearyl alcohol, etherified with 25 moles of ethylene oxide, an effective amount of 1,2-propylene glycol as an antifrost agent, an effective fungicidal amount of a 35% aqueous formalin solution, 5 to 20 percent by weight of urea, and 20 to 30 percent by weight of water.

* * * * *